US008163686B2

(12) United States Patent
Gibis et al.

(10) Patent No.: US 8,163,686 B2

(45) Date of Patent: Apr. 24, 2012

(54) DELIVERY CARTRIDGE

(75) Inventors: Karl-Ludwig Gibis, Limburgerhof (DE); Chris Efstathios Housmekerides, Ludwigshafen (DE)

(73) Assignee: Reckitt Benckiser N.V., WT Hoofddorp (NL)

( * ) Notice: Subject to any disclaimer, the term of this patent is extended or adjusted under 35 U.S.C. 154(b) by 0 days.

(21) Appl. No.: 12/092,609

(22) PCT Filed: Oct. 30, 2006

(86) PCT No.: PCT/GB2006/004053

§ 371 (c)(1),
(2), (4) Date: Jun. 23, 2008

(87) PCT Pub. No.: WO2007/052004

PCT Pub. Date: May 10, 2007

(65) Prior Publication Data

US 2009/0075855 A1 Mar. 19, 2009

(30) Foreign Application Priority Data

Nov. 7, 2005 (GB) .................................. 0522659.2

(51) Int. Cl.

| | |
|---|---|
| ***C11D 3/02*** | (2006.01) |
| ***C11D 3/00*** | (2006.01) |
| ***C11D 3/39*** | (2006.01) |
| ***C11D 17/00*** | (2006.01) |
| ***C11D 3/386*** | (2006.01) |
| ***C11D 3/395*** | (2006.01) |
| ***C11D 7/18*** | (2006.01) |
| ***C11D 7/54*** | (2006.01) |
| ***C11D 9/42*** | (2006.01) |
| ***C11D 7/42*** | (2006.01) |
| ***C11D 9/20*** | (2006.01) |
| ***C11D 17/06*** | (2006.01) |
| ***C11D 3/60*** | (2006.01) |
| ***C11D 7/00*** | (2006.01) |
| ***C11D 7/60*** | (2006.01) |
| ***C12S 9/00*** | (2006.01) |
| ***B08B 9/20*** | (2006.01) |
| ***B67D 1/08*** | (2006.01) |

(52) U.S. Cl. ........ 510/229; 510/218; 510/219; 510/220; 510/224; 510/226; 510/228; 510/234; 510/367; 510/374; 510/396; 510/398; 510/446; 510/533; 134/25.2; 222/148

(58) Field of Classification Search .......... 510/218–233, 510/234, 367, 374, 396, 398, 446, 533; 134/25.2; 222/148

See application file for complete search history.

(56) References Cited

U.S. PATENT DOCUMENTS

| | | | | |
|---|---|---|---|---|
| 5,719,111 | A | 2/1998 | Van Den Brom et al. | |
| 6,162,259 | A | 12/2000 | Williams (nee MacBeath) | |
| 6,235,704 | B1 | 5/2001 | Detering et al. | |
| 6,956,016 | B2 * | 10/2005 | Speed et al. | 510/296 |
| 2002/0117511 | A1 | 8/2002 | McNabb et al. | |
| 2003/0119707 | A1 * | 6/2003 | Kosub et al. | 510/446 |
| 2005/0139241 | A1 | 6/2005 | Jowett et al. | |

FOREIGN PATENT DOCUMENTS

| | | | |
|---|---|---|---|
| DE | 10148851 | A1 | 4/2003 |
| EP | 0203523 | A2 | 12/1986 |
| EP | 1298195 | A1 | 4/2003 |
| JP | 2000063894 | A | 2/2000 |
| JP | 2001003089 | A | 1/2001 |
| WO | 9736974 | A2 | 10/1997 |
| WO | 2006106332 | A | 10/2006 |

OTHER PUBLICATIONS

Handbook of Water-Soluble Gums and Resins, Robert L. Davidson, McGraw-Hill 1980, p. 21-16.

Dissolvine Technical Literature, Mar. 2004, Akzo Nobel.

Opposition Statement from European Application No. 06808373.2/1948776.

English Language Abstract for JP2000063894 taken from esp@cenet.com, Feb. 29, 2000.

English Language Abstract for JP2001003089 taken from esp@cenet.com, Jan. 9, 2001.

English Language Abstract for EP0203523 taken from esp@cenet.com, Dec. 3, 1986.

* cited by examiner

*Primary Examiner* — Lorna M Douyon

*Assistant Examiner* — Tanisha Diggs

(74) *Attorney, Agent, or Firm* — Norris McLaughlin & Marcus PA

(57) ABSTRACT

A dishwasher detergent delivery cartridge comprises a plurality of unit dose elements of a dishwasher detergent composition, the composition being a substantially coherent mass and comprising at least 20 wt % of methyl glycine diacetic acid and/or a salt thereof and/or of glutamic diacetic acid and/or a salt thereof. Such compositions have been found to have excellent stability and/or performance in multi-dose applications.

13 Claims, 2 Drawing Sheets

Cleaning performance (acc to IKW) of formula 1 on relevant stains; showing no significant loss of performance while stored in the DW over 12 cycles (Miele 651 SC, 55 °C, 21 °GH)

DELIVERY CARTRIDGE

This is an application filed under 35 USC 371 of PCT/GB2006/004053.

TECHNICAL FIELD

This invention relates to a device comprising a plurality of unit dose elements of a soluble or dispersible detergent composition, for use in machine dishwashing.

BACKGROUND AND PRIOR ART

Existing commercial dishwashing compositions are usually tablets formed by compression and consolidation of particulates. Such tablets are usually individually wrapped, in order to keep them in good condition. However it is an inconvenience for consumers, to have to unwrap a tablet for each wash.

Important components of a dishwasher detergent composition are builders, bleach, bleach activators, enzymes, and surfactants (not all of which may be present in a given composition). Builders are most commonly phosphates, for example sodium tripolyphosphate (STPP). Phosphates are extremely effective builders in dishwashing compositions acting as a chelating agents to combat or capture metal ions in solution. Not only can they bind calcium and magnesium ions, they can also act as an alkalinity source for the wash liquor, and are user to buffer the wash liquor about pH 9, together with other chemicals present. Also, they are able to keep existing calcium carbonate in the wash liquor in a dispersed form, to prevent spotting onto tableware. Phosphates also support the bleaching efficiency of the bleach system, if one is present.

As bleaches, generally hypochlorides i.e. sodium dichloroisocyanurate or oxygen based bleaches, for example perborates, percarbonates, persulfates or other peroxide derivatives together with bleach activators e.g. TAED are used. They assist in the removal of bleachable stains from the dishware. Amylases and proteases are efficient enzymes to remove starch and protein soils. Surfactants can emulsify fatty soils.

In the present invention we are seeking to supply detergent compositions in delivery cartridges containing a plurality of unit dose elements of the composition. The composition would probably be retained in a series of separate chambers and some of the unit dose elements will be present in the dishwasher for several cycles. The above described detergent formulations, the current standards, would not to be suitable to survive the harsh conditions (up to 75° C. and 100% humidity) in the dishwasher over several cycles. One reason for this is temperature and humidity sensitivity of the bleach components and the enzymes in the described formulas. Perborates and percarbonates undergo decomposition under these conditions. Enzymes are known to be adversely affected by the effect of heat and/or humidity especially when subjected to these conditions for prolonged periods of time. This is further exacerbated by the presence of bleach components. In addition, existing detergent formats such as powders or tablets offer, due to their micro-porous structure, a high surface area to the dishwasher environment which accelerates decomposition. They readily absorb water and consequently can lose their structure, and their shape.

JP002000063894AA discloses detergent compositions comprising 2-75 wt % sodium glutamic acid diacetate. The compositions are said to be safe to handle.

It has already been disclosed to provide in an automatic dishwasher devices to receive/hold a plurality of detergent unit doses; see for example US2005/0139241 and US2002/0117511.

An aim of the present invention is to find a stable composition and/or product format without compromising on cleaning performance and other performance indicators like spotting and filming. In particular, it is an aim of the present invention to find such a composition or format which exhibits acceptable stability when subjected to two or more cycles of an automatic dishwasher.

STATEMENT OF INVENTION

We found out that the use of certain organic builders, in a particular methyl glycine diacetic acid and/or salts thereof (hereinafter collectively called MGDA) and/or glutamatic diacetic acid and/or salts thereof (hereinafter collectively called GDA), in combination with a defined detergent format gives highly stable detergents suitable for the desired purpose.

In accordance with a first aspect of the present invention there is provided a dishwasher detergent delivery cartridge comprising a plurality of unit dose elements of a dishwasher detergent composition, the composition being a substantially coherent mass and comprising at least 20 wt % of methyl glycine diacetic acid and/or a salt thereof (also referred to herein collectively as MGDA) and/or of glutamic diacetic acid and/or a salt thereof (also referred to herein collectively as GDA).

In accordance with a second aspect of the invention there is provided a method of providing a delivery cartridge according to the first aspect of the invention, the method comprising the formation of the unit dose elements without using a tablet compaction method.

In accordance with a third aspect there is provided a dishwasher detergent composition, the composition being a coherent mass and comprising at least 20 wt % of methyl glycine diacetic acid and/or a salt thereof and/or of glutamic diacetic acid and/or a salt thereof, together with from 0.1 wt % up to 5 wt % PVP.

In accordance with a fourth aspect there is provided a method of washing kitchenware in a dishwashing machine, using a delivery cartridge according to the first aspect to provide the dishwasher detergent composition required.

In accordance with a fifth aspect there is provided a method of washing kitchenware in a dishwashing machine, using a dishwasher detergent composition according to the third aspect.

It has been found that the present invention provides a dishwasher detergent delivery cartridge exhibiting good stability of the unit dose elements across two or more washes in the dishwasher. In particular, good stability is exhibited across the total number of unit dose elements in the cartridge during use in the dishwasher so that physical characteristics such as dissolution or performance are not significantly different between the first and last unit dose element in the cartridge after use and storage in the dishwasher. This applies also to the chemical stability of the unit dose elements upon storage in the dishwasher.

According to an especially preferred aspect of the present invention, the cleaning performance of the first unit dose element and the last unit dose element in the cartridge does not vary by more than 30%, preferably by not more than 20%, most preferably by not more than 15%. This value is calculated by designating the performance values on bleachable stains, proteins and starch for the first unit dose element as 100% and expressing the performance values on the same stains for the last formulation as a percentage thereof. The average value for the performance on these three stains is used to assess the variation in performance from the first unit dose element to the last unit dose element. Thus preferably the average performance value of the last unit dose element is not less than 70% of the average performance value of the first element.

In the present specification when we say that the composition is a substantially coherent mass, we mean that it has a solid or non-porous or non-particulate microstructure or is continuous. The composition may function as a matrix for other components, e.g. particulates, for example enzymes. The unit dose elements may, for example, be formed by injection moulding or by extrusion, but not by pressing of particulates.

Throughout this specification "wt %" denotes the weight of the named component as a percentage of the total weight of the composition, unless otherwise stated explicitly.

MGDA has been proposed already as a possible component of dishwashing compositions. For example WO 01/12768 discloses a mixed powder or granulate composition comprising 5-70 wt % MGDA and 30-95 wt % of a polycarboxylate.

WO 97/36989 describes a bleaching composition containing percarbonate and MGDA. The bleaching composition may be incorporated into a detergent composition, also comprising a builder and/or a surfactant. Compaction forming methods are described.

WO 97/36990 is a related patent application which describes a detergent composition comprising a phosphate builder and an amino tricarboxylic acid cation chelating agent. Compaction forming methods are described.

Preferably the MGDA and/or GDA is present in the composition used in the present invention in an amount of at least 25 wt %, preferably at least 30 wt %, more preferably at least 35 wt %, most preferably at least 40 wt %.

Preferably the MGDA and/or GDA is present in an amount of up to 70 wt %, preferably up to 60 wt %, preferably up to 50 wt %.

The percentage definitions given herein apply to MGDA and GDA in combination, when both are present. Where both are present it is preferred to have at least 50 wt % of the mixture of MGDA and GDA as MGDA, more preferably at least 75 wt % for performance reasons.

The MGDA and/or GDA is present as a builder. A further builder, or builders, may be present.

A preferred MGDA compound is a salt of methyl glycine diacetic acid. Suitable salts include the diammonium salt, the dipotassium salt and, preferably, the disodium salt.

A preferred GDA compound is a salt of glutamic diacetic acid. Suitable salts include the diammonium salt, the dipotassium salt and, preferably, the disodium salt.

An inorganic builder may be present as an additional builder in the present invention. Suitable inorganic builders may include carbonates, bicarbonates, borates, silicates, aluminosilicates, phosphates, such as STPP, and phosphonates.

When a further builder is present it is preferably an organic builder, or builders; preferably selected from water-soluble monomeric polycarboxylic acids and/or their acid forms, suitably as monomers or oligomers. Examples of suitable organic builders include the water-soluble salts of citric acid, tartaric acid, lactic acid, glycolic acid, succinic acid, malonic acid, maleic acid, diglycolic acid and fumaric acid. Other suitable organic builders are polyacrylates and co-polymers of acrylates with maleic acid and sulfonated polymers. Other suitable organic builders are polyasparaginic acid and its salts and iminodisuccinic acid and its salts.

A further builder (or builders) may suitably be present in an amount of at least 5 wt %, preferably at least 10 wt %, more preferably at least 15 wt % (total amounts, when there is more than one further builder present).

A further builder (or builders) may suitably be present in an amount of up to 50 wt %, preferably up to 30 wt %, more preferably up to 25 wt % (total amounts, when there is more than one further builder present).

Generally the detergent body formulation comprises a lubricant. Such a material has been found to display excellent properties in the formation of the unit dose elements. Namely a lubricant may facilitate the transport of the detergent composition into/within, for example, the injection moulding mould or to enable the extrusion process.

Furthermore lubricants have been found to be advantageous in protecting sensitive ingredients of the detergent composition, in particular enzymes, from degradation in the warm humid environment in the dishwasher. They appear to form a matrix wherein the enzymes (or other sensitive components) are substantially or completely covered by the selected lubricant. This effect in enhanced by the fact that the lubricants appear to form in the process, in particular in an injection moulding process, a protective layer at the surface of the element.

A lubricant is preferably present at an amount of from 0.1 wt % to 30 wt %, more preferably from 10 wt % to 20 wt %.

Preferred examples of lubricants include; fatty acids and derivatives thereof, such as alkali metal and ammonium salts of fatty acid carboxylates (e.g. ammonium stearate, sodium oleate, potassium laureate), also polyethylene glycol (PEG)/glycerol functionalised with fatty acid carboxylates (e.g. PEG mono-oleate, PEG ricinoleate, glycerol mono-ricinoleate); sucrose glycerides; oils (such as olive oil, silicon oil, paraffin oil); and low melting point non-ionic surfactants, preferably those having a melting point of 60° C. or below, more preferably 55° C. or below, most preferably 50° C. or below.

Most preferably the lubricant comprises polyethylene glycol having a molecular weight of from 500 to 30000, more preferably of from 1000 to 5000 and most preferably of from 1200 to 2000. Preferred examples of polyethylene glycol include those having a molecular weight of 1500 or 3000. Grades of PEG are sold with reference to their nominal molecular weights, and when we talk, for example, about PEG of molecular weight 500 to 30000, we are talking about the nominal molecular weight, based on the names under which the PEG compounds are sold.

The addition of binders such as polyvinyl-pyrrolidone (PVP, e.g. Luvitec® VA 64 from BASF) has a significant impact on the dissolution speed of the detergent composition elements in the washing cycle. Increasing concentrations of PVP, ranging from 0.1 wt % up to 5 wt %, can reduce the dissolution speed of the detergent composition element. This can be used to adjust the dissolution speed to a level, such that the sticks can survive a cold pre-wash cycle, the full amount of detergent being delivered to the main wash cycle where it is needed. The dissolution speed is of course dependent on the temperature, leading to slow dissolution in cold water and fast dissolution in hot water (main wash cycle). Preferably at least 0.1 wt % PVP is present, preferably at least 0.2 wt %. Preferably up to 5 wt % PVP is present, more preferably up to 4 wt %, most preferably up to 2 or 1 wt %.

The compositions, particularly may also independently comprise enzymes, such as protease, lipase, amylase, cellulase and peroxidase enzymes. Such enzymes are commercially available and sold, for example, under the trade marks Esperase®, Alcalase® and Savinase® by Nova Industries A/S and Maxatase® by International Biosynthetics, Inc. Desirably the enzyme(s) is/are present in the composition in an amount of from 0.01 to 3 wt %, especially 0.01 to 2 wt % (total enzyme complement present). These amounts relate to the commercial preparations, which contain additional materials; the equivalent amount of pure enzyme present is probably about one-fifth of the as-supplied amount, in a typical case.

Preferably particulate components such as enzymes are enrobed or enveloped in the detergent composition.

The composition may contain surface active agents such as an anionic, non-ionic, cationic, amphoteric or zwitterionic surface active agents or mixtures thereof. Many such surfactants are described in Kirk Othmer's Encyclopedia of Chemical Technology, 3rd Ed., Vol. 22, pp. 360-379, "Surfactants and Detersive Systems", incorporated by reference herein.

A surfactant, or surfactants, may be present in the composition in an amount of at least 1 wt %, preferably at least 2 wt %, more preferably at least 3 wt % (total complement). A surfactant, or surfactants, may be present in the composition in an amount of up to 30 or 20 wt %, preferably up to 10 wt %, more preferably up to 5 wt % (total complement).

When a surfactant is present a nonionic surfactant is preferred.

One possible class of nonionic surfactants are ethoxylated non-ionic surfactants prepared by the reaction of a monohydroxy alkanol or alkylphenol with 6 to 20 carbon atoms with preferably at least 12 moles particularly preferred at least 16 moles, and still more preferred at least 20 moles of ethylene oxide per mole of alcohol or alkylphenol.

Particularly preferred non-ionic surfactants are the nonionics from a linear chain fatty alcohol with 16-20 carbon atoms and at least 12 moles particularly preferred at least 16 and still more preferred at least 20 moles of ethylene oxide per mole of alcohol.

According to one preferred embodiment of the invention, the non-ionic surfactants additionally comprise propylene oxide units in the molecule. Preferably this PO units constitute up to 25% by weight, preferably up to 20% by weight and still more preferably up to 15% by weight of the overall molecular weight of the non-ionic surfactant. Particularly preferred surfactants are ethoxylated mono-hydroxy alkanols or alkylphenols, which additionally comprises polyoxyethylene-polyoxypropylene block copolymer units. The alcohol or alkylphenol portion of such surfactants constitutes more than 30%, preferably more than 50%, more preferably more than 70% by weight of the overall molecular weight of the nonionic surfactant.

Another class of suitable non-ionic surfactants includes reverse block copolymers of polyoxyethylene and polyoxypropylene and block copolymers of polyoxyethylene and polyoxypropylene initiated with trimethylolpropane.

Another preferred class of nonionic surfactant can be described by the formula:

$$R^1O[CH_2CH(CH_3)O]_X[CH_2CH_2O]_Y[CH_2CH(OH)R^2]$$

where $R^1$ represents a linear or branched chain aliphatic hydrocarbon group with 4-18 carbon atoms or mixtures thereof, $R^2$ represents a linear or branched chain aliphatic hydrocarbon rest with 2-26 carbon atoms or mixtures thereof, x is a value between 0.5 and 1.5 and y is a value of at least 15.

Another group of preferred nonionic surfactants are the end-capped polyoxyalkylated non-ionics of formula:

$$R^1O[CH_2CH(R^3)O]_X[CH_2]_kCH(OH)[CH_2]_jOR^2$$

where $R^1$ and $R^2$ represent linear or branched chain, saturated or unsaturated, aliphatic or aromatic hydrocarbon groups with 1-30 carbon atoms, $R^3$ represents a hydrogen atom or a methyl, ethyl, n-propel, isopropyl, n-butyl, 2-butyl or 2-methyl-2-butyl group, x is a value between 1 and 30 and, k and j are values between 1 and 12, preferably between 1 and 5. When the value of x is >2 each $R^3$ in the formula above can be different. $R^1$ and $R^2$ are preferably linear or branched chain, saturated or unsaturated, aliphatic or aromatic hydrocarbon groups with 6-22 carbon atoms, where groups with 8 to 18 carbon atoms are particularly preferred. For the group $R^3H$, methyl or ethyl are particularly preferred. Particularly preferred values for x are comprised between 1 and 20, preferably between 6 and 15.

As described above, in case x>2, each $R^3$ in the formula can be different. For instance, when x=3, the group $R^3$ could be chosen to build ethylene oxide ($R^3$=H) or propylene oxide ($R^3$=methyl) units which can be used in every single order for instance (PO)(EO)(EO), (EO)(PO)(EO), (EO)(EO)(PO), (EO)(EO)(EO), (PO)(EO)(PO), (PO)(PO)(EO) and (PO)(PO)(PO). The value 3 for x is only an example and bigger values can be chosen whereby a higher number of variations of (EO) or (PO) units would arise.

Particularly preferred end-capped polyoxyalkylated alcohols of the above formula are those where k=1 and j=1 originating molecules of simplified formula:

$$R^1O[CH_2CH(R^3)O]_XCH_2CH(OH)CH_2OR^2$$

The use of mixtures of different nonionic surfactants is suitable in the context of the present invention for instances mixtures of alkoxylated alcohols and hydroxy group containing alkoxylated alcohols.

Other suitable surfactants are disclosed in WO 95/01416, to the contents of which express reference is hereby made.

The dishwasher detergent according to the invention can also comprise one or more foam control agents. Suitable foam control agents for this purpose are all those used in this field, such as, for example, silicones and paraffin oil.

The foam control agents are preferably present in the dishwasher detergent according to the invention in amounts of less than 5% by weight of the total weight of the detergent.

The dishwasher detergent according to the invention can also comprise a source of acidity or a source of alkalinity, to obtain the desired pH, on dissolution. A source of acidity may suitably be any of the components mentioned above, which are acidic; for example polycarboxylic acids. A source of alkalinity may suitably be any of the components mentioned above, which are basic; for example any salt of a strong base and a weak acid. However additional acids or bases may be present. In the case of alkaline compositions silicates may be suitable additives. Preferred silicates are sodium silicates such as sodium disilicate, sodium metasilicate and crystalline phyllosilicates.

The detergent body may further include other common detergent components such as corrosion inhibitors (for example those for use on silver or glass), surfactants, fragrances, anti bacterial agents, preservatives, pigments or dyes.

Bleaches could also be included, optionally with bleach activators. When a bleach is present, it is preferably present in the composition in an amount of at least 1 wt %, more preferably at least 2 wt %, more preferably at least 4 wt %; and in an amount of up to 30 wt %, more preferably up to 20 wt %, and most preferably up to 15 wt %. It is preferably selected from inorganic perhydrates such as peroxymonopersulfate (KMPS) or organic peracids and the salts thereof; for example phthalimidoperhexanoic acid (PAP).

However, good cleaning performance has been obtained without bleaches, even on tea stains which are generally regarded as requiring bleach. Accordingly a bleach is not preferred in the compositions of the present invention and thus according to one aspect it is preferred that the detergent composition comprises 10 wt % or less bleach, more preferably 5 wt % or less bleach, most preferably 2 wt % or less bleach and especially that the composition is (substantially) bleach-free. It has been found that by limiting the levels of bleach in the compositions better stability, especially chemical stability, is obtained.

Sulfonated polymers are suitable for use in the present invention. Preferred examples include copolymers of $CH_2{=}CR^1{-}CR^2R^3{-}O{-}C_4H_3R^4{-}SO_3X$ wherein $R^1$, $R^2$, $R^3$, $R^4$ are independently 1 to 6 carbon alkyl or hydrogen, and X is hydrogen or alkali with any suitable other monomer units including modified acrylic, fumaric, maleic, itaconic, aconitic, mesaconic, citraconic and methylenemalonic acid or their salts, maleic anhydride, acrylamide, alkylene, vinylmethyl ether, styrene and any mixtures thereof. Other suitable sulfonated monomers for incorporation in Sulfonated (co) polymers are 2-acrylamido-2-methyl-1-propanesulfonic acid, 2-methacrylamido-2-methyl-1-propanesulfonic acid, 3-methacrylamido-2-hydroxy-propanesulfonic acid, allysulfonic acid, methallysulfonic acid, 2-hydroxy-3-(2-propenyloxy)propanesulfonic acid, 2-methyl-2-propenen-1-sulfonic acid, styrenesulfonic acid, vinylsulfonic acid, 3-sulfopropyl acrylate, 3-sulfopropylmethacrylate, sulfomethylacrylamide, sulfomethylmethacrylamide and water soluble salts thereof. Suitable sulfonated polymers are also described in U.S. Pat. No. 5,308,532 and in WO 2005/090541.

When a sulfonated polymer is present, it is preferably present in the composition in an amount of at least 0.1 wt %, preferably at least 0.5 wt %, more preferably at least 1 wt %, and most preferably at least 3 wt %.

When a sulfonated polymer is present, it is preferably present in the composition in an amount of up to 40 wt %, preferably up to 25 wt %, more preferably up to 15 wt %, and most preferably up to 10 wt %.

Sulfonated polymers are used in detergency applications as polymers to disperse Ca-phosphate compounds and prevent their deposition. To our surprise we have found them to give cleaning benefits in combination even with preferred phosphorus-free compositions of the present invention.

The compositions of the present invention are very well adapted to manufacture by the forming processes which involve elevating the temperature of the composition, then forming it to a shape when liquefied, or softened. Examples include injection moulding (e.g. in accordance with the process described in WO 2005/035709), pour-moulding or casting, and extrusion. Extrusion processes are well known in the art and do not need to be further described here._In such processes the temperature of the composition may be in the range 30 to 60° C., preferably 40 to 50° C. It is found that the composition is not degraded to any substantive level, not even when enzymes are present; enzymes being, of course, heat sensitive. It may be that the coherent form (e.g. matrix) of the composition affords protection to the enzymes.

Any other suitable process for the preparation of the coherent mass may be used although injection moulding and extrusion are especially preferred.

The unit dose elements used in the present invention are preferably self-supporting. For example they may be in the form of a lozenge or stick or ball.

Preferably the unit dose elements of the present invention are insoluble, or not very soluble, in the cold water (typically between 5°-25° C.) of a prewash but easily soluble in the hot water of a main wash. By not very soluble, we mean that not more than 10% of the weight of the unit dose element dissolves in the prewash.

The unit dose elements may be coated with an agent which screens the detergent from the atmosphere e.g. such as a suitable plastic wrapping. However this may not be needed. To our surprise we have found that unit dose elements of detergent composition in accordance with the present invention appear to be resistant to atmospheric degradation for a useful period, even when a plurality of unit dose elements are contained within a refill, and the respective unit dose elements are dissolved one at a time, in a generally humid environment. Even the last unit dose element to be dissolved has remained in good condition, in our experiments.

Preferably a delivery cartridge of the first aspect is a refill device having a plurality of chambers which retain unit dose elements of the composition of the first aspect, the unit dose elements being separate from each other, the delivery cartridge being adapted for engagement in a housing, the housing being built-into the dishwasher or independent of the dishwasher. However the precise design of the delivery chamber is not thought central to the present invention. The invention is based on the finding that unit doses of the composition described herein survive repeated exposure to warm and humid ADW conditions. This offers the possibility of the multi-does delivery cartridge.

In accordance with a second aspect of the present invention there is provided a method of producing a delivery cartridge of the first aspect, the method comprising the formation of the unit dose elements without using a tablet compaction method. Suitably the method comprises manufacturing the unit dose elements and introducing them into the delivery cartridge; however a method in which they are formed in the chambers of the delivery cartridge during manufacture is not excluded.

In accordance with a third aspect of the present invention there is provided a dishwasher detergent composition, the composition being a substantially coherent mass and comprising at least 20 wt % of MGDA and/or GDA, together with 0.1 wt % up to 5 wt % PVP.

In accordance with a fourth aspect to the present invention there is provided a method of washing kitchenware in a dishwashing machine, using a delivery cartridge of the first aspect to provide the dishwasher detergent composition required, or using a dishwasher detergent composition of the second aspect.

In a preferred method of the fourth aspect the composition remains substantially undissolved in a prewash stage, and substantially dissolves in the main wash.

The invention will now be further described by way of example, with reference to the following seven formulae illustrative of the present invention.

Further modifications within the scope of the invention will be apparent to the person skilled in the art.

EXAMPLES

Example 1

Figure 1:
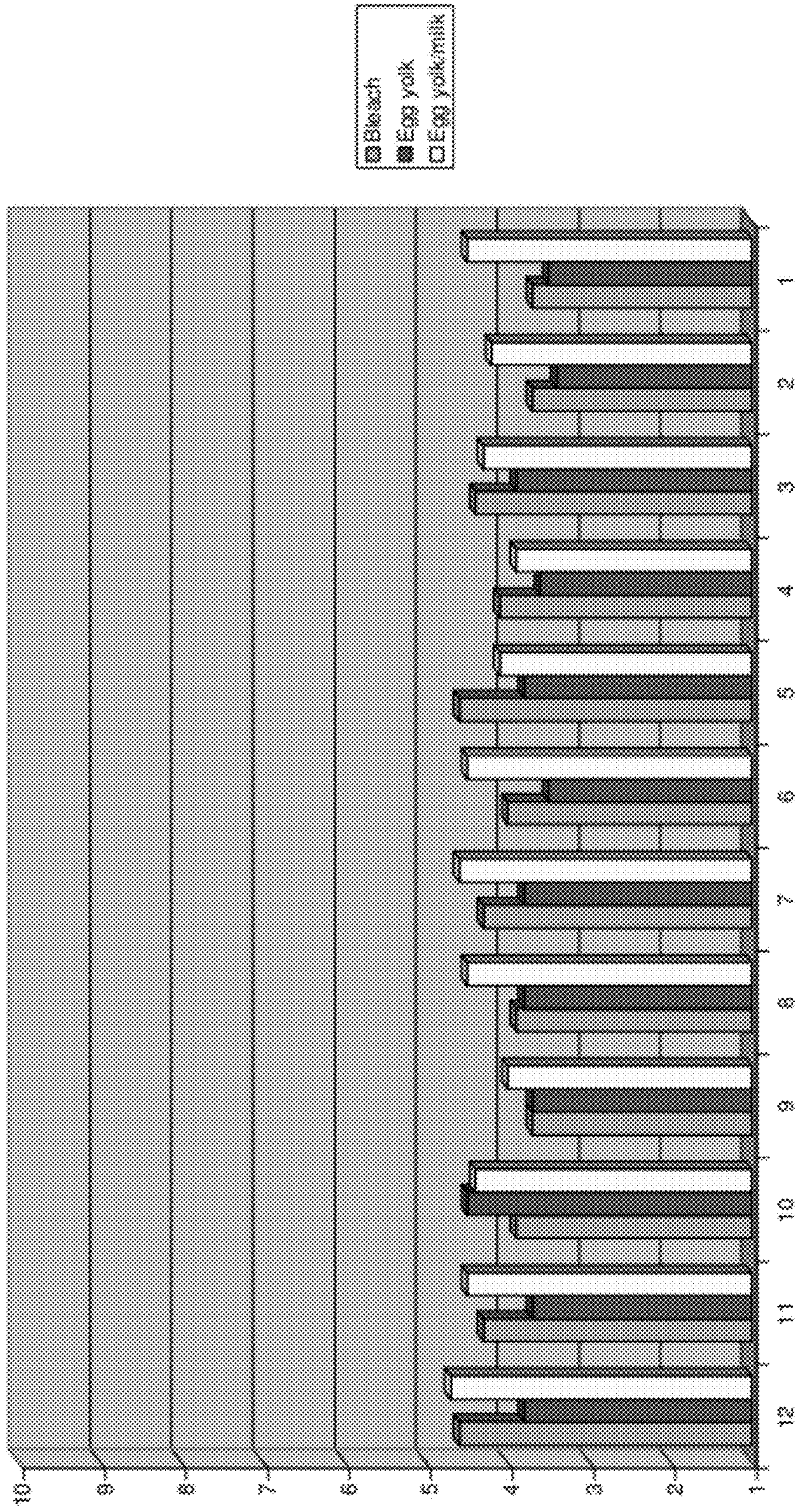
FIG. 1 is a graph showing cleaning performance of formula 1 on relevant stains.

Formulae 1 to 7 were prepared using the components shown in Table 1 below. The formulae were added, with stirring in the order given in Table 1, in a Ruberg-mixer 100 for 4 min at 47 rpm to produce a coherent formulation.

Formulae 1 to 7 were injection moulded under known conditions at the temperatures given in Table 1 using pressures of about 200 bar to produce the detergent sticks. Typically it is possible to use pressures of between about 150 and 1000 bar to produce the sticks.

Alternatively, the compositions could have been extruded using suitable conditions to produce the detergent stick.

All amounts in Table 1 are given as the percentage of the stated raw material used to produce the formulae, based on the total weight of the formula.

TABLE 1

| raw materials | Formula 1 % wt | Formula 2 % wt | Formula 3 % wt | Formula 4 % wt | Formula 5 % wt | Formula 6 % wt | Formula 7 % wt |
|---|---|---|---|---|---|---|---|
| PEG 1500 | 5.00 | 19.00 | 8.00 | 15.89 | 16.00 | 5.00 | 5.00 |
| MGDA disodium salt | | 55.55 | | | 35.55 | | |
| MGDA disodium salt/PEG 1500 4:1 blend (wt:wt) | 69.45 | | 40.00 | | | 69.45 | 69.45 |
| Iminodisuccinate tetrasodium salt | | | 16.50 | | | | |
| Polyaspartate sodium salt | | | 16.50 | | | | |
| Glutamatic acid diacetate disodium salt | | | | 55.56 | | | |
| Sodium tripolyphosphate STTP | | | | | 20.00 | | |
| Sodium carbonate | 7.85 | 8.05 | 5.60 | 7.50 | 7.75 | 6.85 | 7.85 |
| NI surfactant C16-18/25 EO fatty alcohol | 2.00 | 2.00 | 2.00 | 5.00 | 5.00 | 2.00 | 2.00 |
| NI surfactant C16-18/3 EO-PO fatty alcohol, low foaming | 3.40 | 3.40 | 3.40 | 1.40 | 1.40 | 3.40 | 1.90 |
| Modified fatty alcohol polyglycol ether *1 | | | | | | | 1.50 |
| AMPS sulfonated polymer *2 | 5.00 | 5.00 | 3.00 | 5.00 | 5.00 | 5.00 | 5.00 |
| Polyacrylate polymer *3 | 5.00 | 5.00 | 3.00 | 5.00 | 5.00 | 5.00 | 5.00 |
| Enzymes (protease) | 1.50 | 1.50 | 1.50 | 1.50 | 1.50 | 1.50 | 1.50 |
| Enzymes (amylase) | 0.50 | 0.50 | 0.50 | 0.50 | 0.50 | 0.50 | 0.50 |
| Polyvinyl-pyrrolidone/vinyl acetate copolymer (PVP/VA) *4 | | | | 2.00 | 2.00 | | |
| Silicon defoamer liquid | 0.20 | | | 0.20 | 0.20 | 0.20 | 0.20 |
| Fragrance | 0.10 | | | 0.10 | 0.10 | 0.10 | 0.10 |
| ZnSO4•6H2O | | | | 0.35 | | | |
| Total | 100.00 | 100.00 | 100.00 | 100.00 | 100.00 | 100.00 | 100.00 |
| Injection moulding temperature (° C.). | 55 | 53 | 55 | 52 | 52 | 53 | 54 |

*1 Dehypon 3697 GRA M (ex Cognis, Germany),
*2 Acusol 588G (ex Rohm & Haas),
*3 Norasol LMW 45, mwt 4000 (ex Rohm & Haas)
*4 Luvitech VA64 (ex BASF, Germany).
Dehypon, Acusol, Norasol and Luvitech are registered trademarks.

Example 2

A Comparison of the Effect of Concentration of GLDA and MGDA on Performance

The cleaning performance of compositions comprising different levels of MGDA was tested according to the aforementioned IKW test method, using 21° GH and a 50° C. normal dishwashing program in a Miele 651SC automatic dishwashing machine.

Formulations 8a to 8e were produced comprising various levels of MGDA and having the formulations below in Table 2. A maximum of 60% wt MGDA (based on the total weight of the composition) was used with trisodium citrate replacing MGDA in some formulations so that the overall amount of builder remained constant at 60% wt.

TABLE 2

| | % wt | | | | |
|---|---|---|---|---|---|
| ingredient | 8a | 8b | 8c | 8d | 8e |
| MGDA | 60.0 | 40.0 | 35.0 | 30.0 | 20.0 |
| Tri-sodium citrate | 0.0 | 20.0 | 25.0 | 30.0 | 40.0 |
| PEG 1500 | 19.0 | 19.0 | 19.0 | 19.0 | 19.0 |

TABLE 2-continued

| | % wt | | | | |
|---|---|---|---|---|---|
| ingredient | 8a | 8b | 8c | 8d | 8e |
| Sodium carbonate | 3.3 | 3.3 | 3.3 | 3.3 | 3.3 |
| NI surfactant C16-18/25 EO fatty alcohol | 2.0 | 2.0 | 2.0 | 2.0 | 2.0 |
| NI surfactant C16-18/3 EO-PO fatty alcohol, low foaming | 3.4 | 3.4 | 3.4 | 3.4 | 3.4 |
| AMPS sulfonated polymer *2 | 5.0 | 5.0 | 5.0 | 5.0 | 5.0 |
| Polyacrylate polymer *3 | 5.0 | 5.0 | 5.0 | 5.0 | 5.0 |

TABLE 2-continued

| | % wt | | | | |
|---|---|---|---|---|---|
| ingredient | 8a | 8b | 8c | 8d | 8e |
| Enzymes (protease) | 1.5 | 1.5 | 1.5 | 1.5 | 1.5 |
| Enzymes (amylase) | 0.5 | 0.5 | 0.5 | 0.5 | 0.5 |
| Silicon defoamer liquid | 0.2 | 0.2 | 0.2 | 0.2 | 0.2 |
| Fragrance | 0.1 | 0.1 | 0.1 | 0.1 | 0.1 |

The formulations a to e above were produced by mixing the ingredients in Table 2 using a Ruberg mixer 100 at 47 rpm for 4 min to form a coherent mass as described for Example 1. The formulations so produced were then injection moulded using conventional conditions and processes as described for Example 1.

The cleaning performance on bleachable stains, starch, proteins and burnt-on stains of formulation a (60% MGDA) was used as a reference and given a value of 100. The cleaning performance of formulations b-e are expressed as percentages relative to the value for formulation in Table 3 below;

TABLE 3

| | a | b | c | d | e |
|---|---|---|---|---|---|
| bleachable stains | 100.0 | 76.0 | 68.0 | 57.0 | 41.0 |
| Starch | 100.0 | 100.0 | 100.0 | 100.0 | 100.0 |
| Proteins | 100.0 | 89.0 | 81.0 | 75.0 | 65.0 |
| Burnt-on stains | 100.0 | 100.0 | 100.0 | 92.0 | 81.0 |

The results in Table 3 clearly demonstrate the advantages of increasing levels of MGDA in the formulations upon cleaning performance of the compositions.

Example 3

A Comparison of Solid Coherent Products with Corresponding Powder Products

Formulae 1, 2 and 5 of Example 1 were tested in their cleaning performance on tea stains, according to the IKW test method referred to below. Tea stains are normally regarded as stains which require bleaching action. The ranking goes from 1 to 10; the higher the number the better the performance. Water hardness was 21° GH, in a Miele 651 SC Plus dishwasher. The results are shown in Table 4 below.

TABLE 4

| | Formula 1 | Formula 5 | Formula 5 |
|---|---|---|---|
| Powder | 4.0 | 4.4 | 4.4 |
| Sticks | 5.4 | 5.5 | 5.5 |

Thus the finding in each case was that the cleaning performance of the sticks was superior to the cleaning performance of the powder, even though the chemical starting composition and the dosage (20 g) is the same, in each case. The conclusion is that the coherent nature of the material offers benefits.

Example 4

Cleaning Performance

Next, the cleaning performance of formula 1 was assessed in accordance with IKW (Industrieverband für Körper-und Waschpflege based in Frankfurt, Germany) method as published in the SOFW-Journal, 132, 3-2006, pages 55-70 for performance on tea stains, egg yolk stains and mixed egg yolk/milk stains from the first to the twelfth wash, using a Miele 651 SC Plus dishwasher, 55° wash temperature (65° C. in the rinse cycle) 21° GH hardness. That is to say, a cartridge containing 12 sticks of the composition was taken. One stick was used for dishwashing, whilst the other 11 remained in the cartridge device in the dishwasher, subject to the temperature and humidity conditions within the dishwasher, but enclosed to prevent direct contact with water. For the next cycle another stick was used; for the next cycle another; and so on. The final stick to be used had been in the dishwasher through the previous 11 wash cycles.

The results of these tests are shown in FIG. 1, in which the numbers along the x-axis denote the number of sticks present in the cartridge; 12 then 11 down to 1. It can be seen that there was no significant loss in cleaning performance on these stains from the first wash to the twelfth wash. Given that some components of the composition are regarded as being rather temperature and humidity sensitive—notably the protease enzymes—these results were very surprising.

Figure 2:
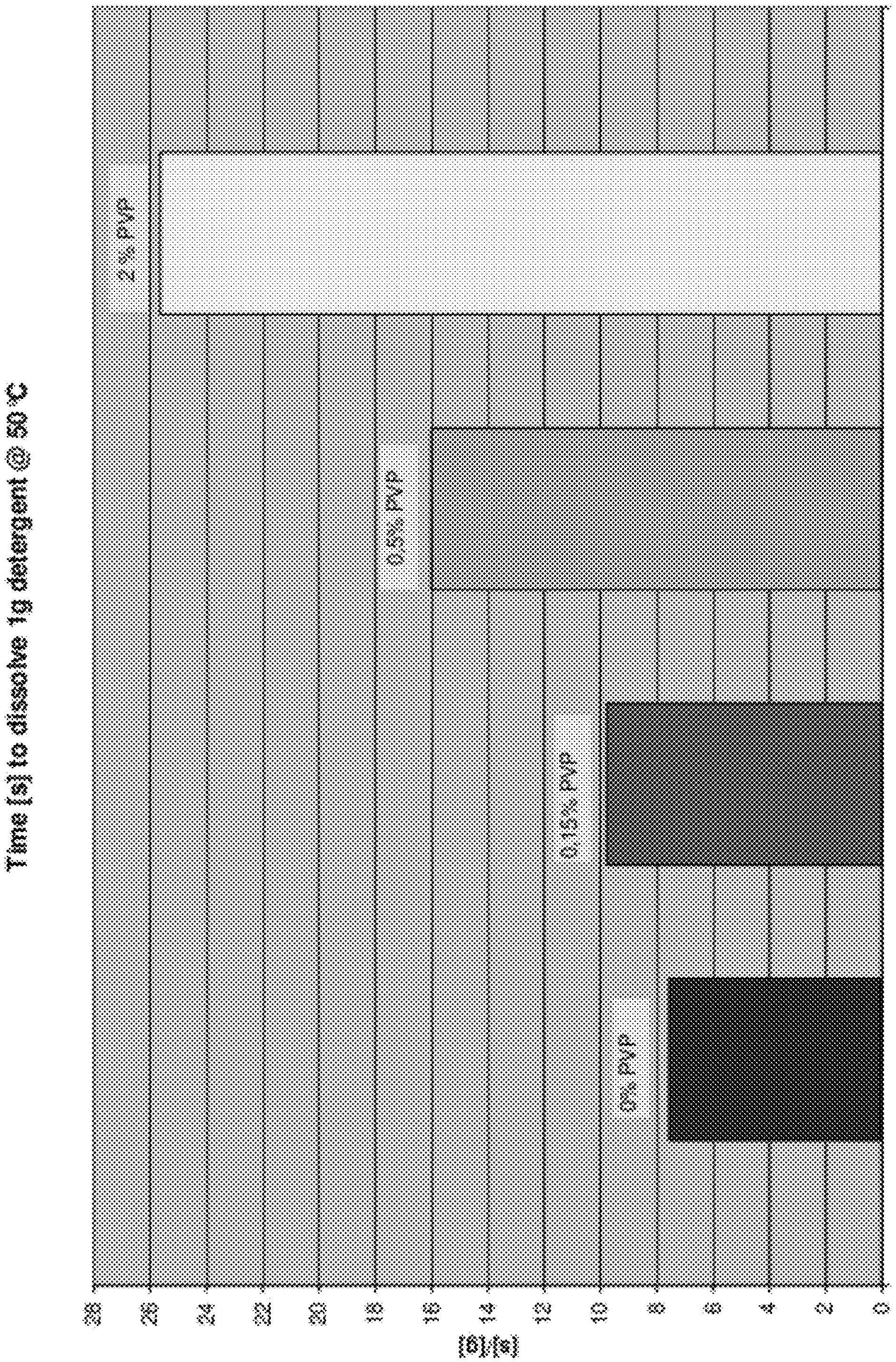
FIG. 2 is a graph showing dissolution time of detergents containing varying amounts of polyvinylpyrolidone (PVP).

In a further series of tests the dissolution speed of the injection moulded sticks was assessed, and in particular the effect of adding varying amounts of polyvinylpyrolidone (PVP) binder (Luvitec VA 64) from BASF. It is desirable for the sticks to survive a cold prewash, so that they are substantially intact, to dissolve fully in the main wash. The results are shown in FIG. 2. With no PVP present dissolution at 50° C. proceeds at a rate of about 1 g of composition in 7.5 seconds. Adding PVP makes the dissolution slower, so that when there is 2% PVP it takes 25.5 seconds to dissolve 1 g of the composition.

The invention claimed is:

1. A dishwasher detergent delivery cartridge comprising a plurality of unit dose elements of a dishwasher detergent composition, the composition being a substantially coherent mass and consisting of:

a) at least 20 wt. % of methyl glycine diacetic acid and/or a salt thereof and/or of glutamic diacetic acid and/or salt thereof;
b) between about 0 to 25 wt. % of a further organic builder;
c) between about 0.1 to 20 wt. % of a lubricant;
d) between about 0.1 to 5 wt. % of a binder;
e) between about 0.01 to 3 wt. % of an enzyme or combination of enzymes;
f) between about 0.1 to 30 wt. % of a surfactant;
g between about 0.1 to 10 wt. % of a sulfonated polymer;
h) optionally between about 1 to 20 wt. % bleach;
i) optionally silicone defoamers; and
j) optionally fragrances, pigments and/or dyes.

2. A delivery cartridge according to claim 1, wherein said builder is selected from an inorganic builder selected from carbonates, bicarbonates, borates, silicates, aluminosilicates, phosphates and phosphonates; and an organic builder selected from monomeric polycarboxylic acids and/or their acid forms, suitably as monomers or oligomers; salts of citric acid, tartaric acid, lactic acid, glycolic acid, succinic acid, malonic acid, maleic acid, diglycolic acid and fumaric acid; polyacrylates and co-polymers of acrylates with maleic acid and sulfonated polymers; polyasparaginic acid and its salts; and iminodisuccinic acid and its salts.

3. A delivery cartridge according to claim 1, wherein said lubricant is selected from: fatty acids and derivatives thereof polyethylene glycol; PEG/glycerol functionalised with fatty acid carboxylates; sucrose glycerides; oils; and low melting point non-ionic surfactants.

4. A delivery cartridge according to claim 1, wherein the binder is PVP.

5. A delivery cartridge according to claim 1 wherein the enzyme(s) is/are enrobed or enveloped in the detergent composition.

6. A delivery cartridge according to claim 1, wherein the composition is substantially bleach free.

7. A delivery cartridge according to claim 1, wherein the unit dose elements are insoluble or not very soluble in the cold water of a prewash but soluble in the hot water of a main wash.

8. A delivery cartridge according to claim 1, wherein the composition is manufactured by a forming process which involves elevating the temperature of the composition to form the unit dose elements.

9. A delivery cartridge according to claim 1, wherein the delivery cartridge is a refill device having a plurality of chambers which retain said unit dose elements, the unit dose elements being separate from each other, the delivery cartridge being adapted for engagement in a housing, the housing being built into a dishwasher or independent of the dishwasher.

10. A delivery cartridge according to claim 1, wherein the cleaning performance of the first unit dose element in the cartridge and the last unit dose element in the cartridge does not vary by more than 20%.

11. A method of providing a delivery cartridge as claimed in claim 1, wherein the unit dose elements are manufactured by injection moulding.

12. A method of washing kitchenware in a dishwashing machine, comprising the step of providing a delivery cartridge according to claim 1 in the dishwashing machine and dispensing the dishwasher detergent composition therefrom.

13. A delivery cartridge according to claim 1, wherein the composition comprises between about 60 to 70 wt % of methyl glycine diacetic acid and/or a salt thereof and/or of glutamic diacetic acid and/or a salt thereof.

* * * * *